July 13, 1937. H. PAXTON 2,086,878
OVERHEAD WAVE MOTION CLEAN OUT
Filed April 24, 1935
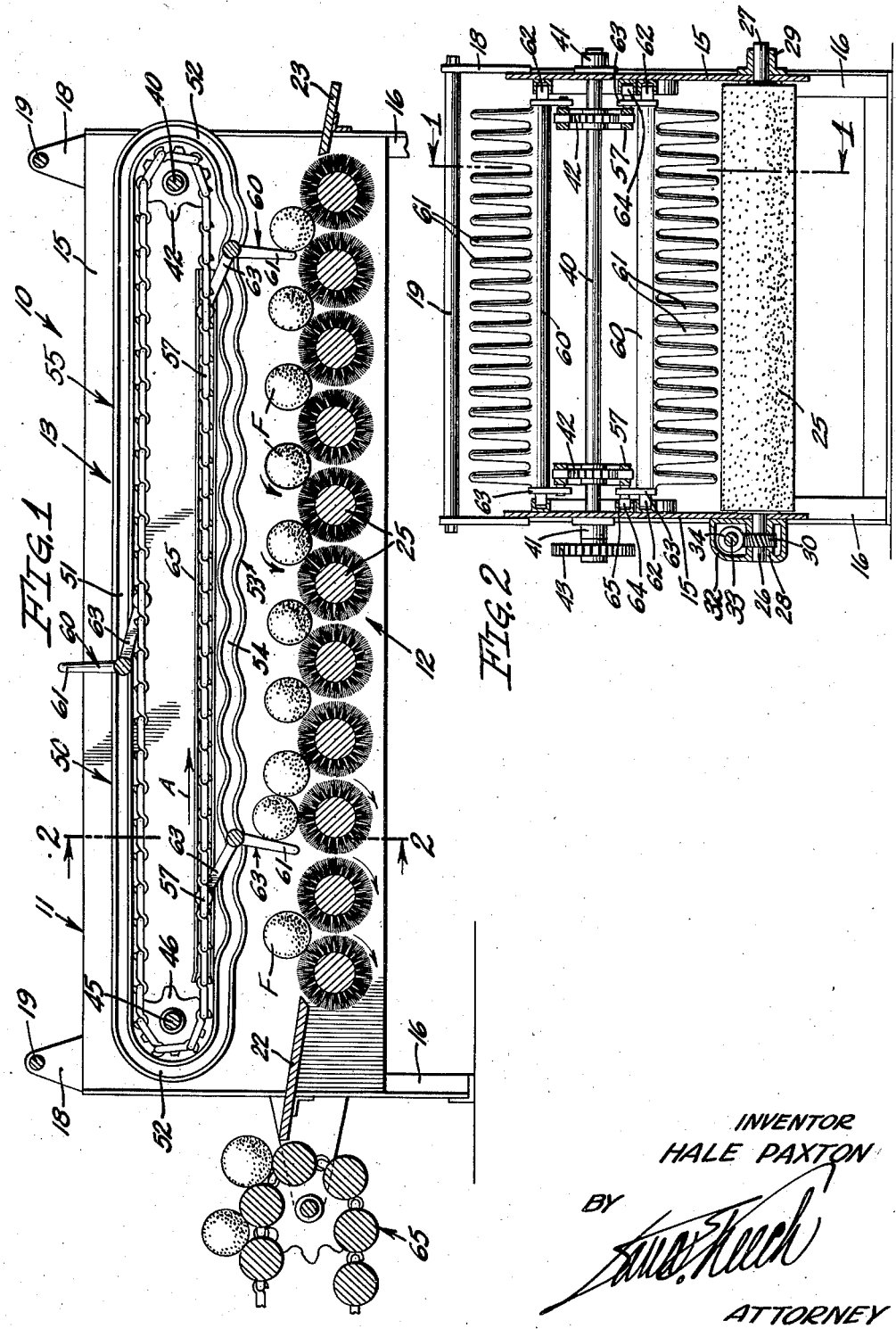
INVENTOR
HALE PAXTON
BY
ATTORNEY Patented July 13, 1937

2,086,878

UNITED STATES PATENT OFFICE 2,086,878

OVERHEAD WAVE MOTION CLEAN OUT

Hale Paxton, Santa Ana, Calif., assignor, by mesne assignments, to Food Machinery Corporation, a corporation of Delaware Application April 24, 1935, Serial No. 17,967

8 Claims. (Cl. 146—202)

My invention relates to the preparation of agricultural produce for market and has particular reference to an improvement in machines for washing, drying, polishing, or otherwise treating citrus fruits and the like.

In the citrus packing industry, oranges, lemons, etc. are thoroughly washed to remove any dirt, scale or other surface impurities before the fruit is packed. A common type of machine used for the washing, drying and polishing operations is known as the transverse brusher and includes a frame in which a plurality of juxtaposed, cylindrical brushes are transversely mounted. The fruit is fed onto the rapidly rotating brushes and tends to remain in the valleys between the brushes until being displaced by the feeding of additional fruit onto the brushes. After washing a given lot of fruit, the valleys remain full and some means must be provided for removing the residual fruit from the washer. The devices used for removing such residual fruit are known as "clean outs".

An object of my invention is to provide a novel form of clean out mechanism for a transverse brusher which is simple to construct and efficient in operation. Other objects and advantages will become apparent in the following description taken in connection with the accompanying drawing, in which:

Fig. 1 is a semi-diagrammatic, longitudinal sectional view of a preferred embodiment of my invention taken on the line 1—1 of Fig. 2.

Fig. 2 is a vertical sectional view taken on the line 2—2 of Fig. 1.

Referring specifically to the drawing, a fruit brusher 10 comprising a preferred embodiment of my invention is shown in Fig. 1, this brusher including a frame 11, a brushing unit 12 and a clean out mechanism 13.

The frame 11 includes a pair of side plates 15, angle iron legs 16 being fixed to opposite ends of the plates 15. Secured on the top sides of the plates 15 at the ends thereof are upstanding brackets 18, the latter supporting transverse tie rods 19. Mounted on opposite ends of the frame 11 are inlet and outlet drop boards 22 and 23 respectively.

The brushing unit 12 includes a plurality of cylindrical, transverse brushes 25, these having trunnions 26 and 27 which are journalled in suitable bearings 28 and 29 respectively on the side plates 15 as shown in Fig. 2. Keyed on the trunnions 26 of each of the brushes 25 is a spiral gear 30. Formed integral with the bearings 28 are housings 32, the latter being formed to provide suitable bearings for a drive shaft 33. Keyed on the drive shaft 33 are spiral gears 34, these being positioned to mesh with the gears 30. The shaft 33 is driven from any suitable source of power and rotates all of the brushes 25 at equal speeds and in the same direction of rotation.

The clean out mechanism 13 includes a drive shaft 40 journalled transversely in bearings 41 at the outlet end of the machine 10. Fixed on the shaft 40 is a pair of sprocket wheels 42 as shown in Fig. 2. Keyed on one end of the shaft 40 is a sprocket wheel 43 by means of which the clean out 13 is driven from any suitable source of power.

Journalled on the inlet end of the frame 11 is an idle shaft 45 on which sprocket wheels 46 are mounted, the latter being aligned with the sprockets 42 of the shaft 40. Mounted on each of the side plates 15 is a guide track 50 formed as shown in Fig. 1 to provide a horizontal upper portion 51, semi-circular end portions 52 and a lower portion 53, the latter being formed of a plurality of successive curved portions 54 connected at their ends. A continuous and endless guide way 55 is provided by the track 50.

Trained about the sprockets 42 and 46 are endless chains 57. Extending transversely of the machine 10 is a plurality of fruit impellers 60 formed to provide a plurality of flexible fingers 61 as shown in Fig. 2. Rotatably mounted on opposite ends of each of the impellers 60 are rollers 62 which extend into a guideway 55 as shown. The impellers 60 are connected to the chains 57 by arms 63, the latter being pivotally connected to the chains 57 and rigidly connected to the impellers 60. Rotatably mounted on the ends of the arms 63 are rollers 64 as shown in Fig. 2. The rollers 64 are received by a track 65 fixed on the side plates 15 as shown. As the impellers 60 are pushed over the brushing unit 12, the vertical movement of the fingers 61 in conjunction with the horizontal movement thereof causes the fingers 61 to accelerate while passing from the valleys between the brushes 25 to the tops of the brushes. This action allows the fruit to remain in the valleys for a longer interval than if the rate of movement of the fingers 61 were constant, it being understood that the fruit is more thoroughly scrubbed while lying in the valleys than when being moved from one valley to another.

Operation

The operation of the machine 10 is as follows:
The drive shaft 33 of the brushing unit 12, when rotated by connecting this with an electric motor or other source of power causes the brushes 25 to turn in the direction indicated by the arrows at a relatively high rate of speed. The chains 57 push the impellers over the brushing unit 12 in the direction indicated by the arrow A. The curved portions 54 of the guide track 50 are properly formed so that the lower extremities of the fingers 61 of the impellers 60 follow a path that substantially conforms to the contour of the upper surface of the series of brushes 25.

Fruit F is fed by a conventional fruit conveyor 65 onto the inlet board 22 and rolls from this into the trough formed by the first two of the brushes 25. The fruit remains in this trough and is constantly rotated and brushed until it is crowded over into the next trough by incoming fruit. This crowding action results in a continuous, wave-like movement of fruit through the machine so long as a stream of fruit is fed to the machine from the conveyor 65.

The operation of the machine 10 is continuous but the lots of fruit put through the machine must be kept separate as they belong to different growers and must be accounted for according to the quantities of each size and grade obtained from each lot in the preparing and packing process. It is to facilitate promptly cleaning from the machine 10 the last portion of fruit in each lot fed thereto that the clean out mechanism 13 is provided.

The fingers 60 preferably always travel through the machine at a substantially faster rate than that at which the fruit moves in response to the crowding from incoming fruit. Thus the fruit preferably does not pass forwardly between the flexible fingers 61. Should the fruit be fed so as to crowd it through the machine faster than the rate of travel of the impellers 60, the individual pieces of fruit push the fingers 61 to one side or the other and passing between these fingers continue on in advance of said fingers.

Although I have shown and described but one preferred form of my invention, it is to be understood that various modifications and changes might be made therein without departing from the spirit and scope of the appended claims.

I claim as my invention:

1. In a fruit washer, the combination of: a frame; a plurality of juxtaposed, rotary brushes journalled transversely in said frame, the upwardly disposed sides of said brushes forming a fruit brushing surface characterized by successive valleys formed between successive pairs of brushes; a power driven endless chain mounted on each side of said frame above said brushes, said chains extending substantially along the entire length of said brushing surface; a continuous stationary guide track on each side of said frame, said tracks being positioned outside the path of said chains; and a fruit impeller extending transversely over said brushing surface, the ends of said impeller being received by said guide tracks, the lower flights of said guide tracks having a wave-like conformation to guide said impellers in a path conforming substantially with the contour of said brushing surface; a pair of arms on said impeller, said arms extending from the ends of said impeller to said chains, said impeller contacting fruit in said valleys and urging said fruit onto the brush forming the advance wall of each of said valleys, said fruit being advanced to the next successive valleys by rotation of said brushes.

2. A combination as in claim 1 in which said impeller comprises a transverse bar extending across said brushing surface, there being a row of flexible fingers extending downward from said bar, the lower extremities of said fingers being disposed in close proximity with said brushing surface when said impeller is being moved from the inlet to the outlet end of said washer.

3. In a fruit washer, the combination of a frame, a plurality of juxtaposed, rotary brushes journalled transversely in said frame, the upwardly disposed sides of said brushes forming a fruit brushing surface characterized by successive valleys formed between each pair of said brushes; a power driven endless chain mounted on each side of said frame above said brushes, said chains being co-extensive with said brushing surface; a continuous stationary guide track on each side of said frame, said tracks being positioned outside the path of said chains, the lower flights of said tracks having a wave-like conformation; a fruit impeller extending transversely over said brushing surface, the ends of said impeller being received by said guide tracks; a guide track for the lower flights of said chains; a row of flexible fingers extending downward from said impeller into the path of fruit on said brushing surface; and a pair of arms rigidly connected to said impeller, the free ends of said arms being pivotally connected to said chains, said fingers contacting fruit in said valleys and urging said fruit onto the brush forming the advance wall of each of said valleys, said fruit being advanced to the next successive valleys by rotation of said brushes, contact of said impeller ends with the lower flights of said guide tracks causing said fingers to follow paths conforming substantially to the contour of said brushing surface.

4. In a fruit washer, the combination of: a frame comprising a pair of spaced side plates; a horizontal row of juxtaposed, rotary brushes journalled on said plates, and extending therebetween, the uppermost sides of said brushes providing a brushing surface characterized by successive valleys formed between each pair of said brushes; a shaft extending transversely of said frame at each end thereof above said brushing surface, the ends of said shafts being journalled in said plates; a pair of equally spaced sprockets on each of said shafts; a pair of chains trained about the sprockets of said shafts; a continuous guide track on the inner faces of each of said plates, said tracks being positioned outside of the path of said chains; and a fruit impeller extending transversely between said plates, said impeller being moved by said chains and guided by said guide tracks, said impeller, when guided by the lower flights of said tracks, urging fruit out of each of said valleys and into the next valley, the lower flights of said guide tracks having a wave-like conformation so as to guide said impellers in a path conforming substantially to the contour of said brushing surface.

5. In a fruit washer, the combination of: a frame comprising a pair of spaced side plates; a horizontal row of juxtaposed, rotary brushes journalled on said plates, and extending therebetween, the uppermost sides of said brushes providing a brushing surface characterized by successive valleys formed between each pair of said brushes; a shaft extending transversely of said frame at each end thereof above said brushing surface, the ends of said shafts being journalled in said plates; a pair of equally spaced sprockets on each of said shafts; a pair of endless chains trained about the sprockets of said shafts; a continuous guide track on the inner faces of each of said plates, said tracks being positioned outside of the path of said chains; a bar extending transversely between said plates, the ends of said bar being guided by said guide tracks, said bar having an arm at each end thereof, the extremities of said arms being connected to said chains at points disposed rearwardly from said bar; a row of flexible fruit engaging fingers extending downward from said bar, the lower flights of said guide tracks being formed to guide said bar so that the lower extremities of said fingers follow a path substantially conforming to the contour of said brushing surface, said fingers urging fruit out of each of said valleys and into the next successive valley.

6. In a fruit treating machine, a series of treating rolls arranged transversely of the flow of fruit thereover and in adjacent parallel relation to form fruit supporting valleys therebetween, fruit propelling mechanism mounted above said rolls and comprising traveling carrier means having an impeller depending therefrom to engage with and advance fruit from valley to valley across the rolls, and a stationary guide track of wave-like conformation operatively guiding said carrier means on its course of travel to direct said impeller along an undulating path approximating the contour of the rolls, the lowermost points of said path of the impeller being disposed at the valleys between said brushes.

7. In a fruit treating machine, a series of treating rolls arranged transversely of the flow of fruit thereover and in adjacent parallel relation to form fruit supporting valleys therebetween, an impeller for engaging with and advancing fruit from valley to valley across the rolls, stationary guide track means of wave-like conformation, means for causing said impeller to travel over said rolls to perform its function as aforesaid, and means engaging and guided by said guide track means and imparting movement thus acquired to said impeller to cause the latter when traveling over said rolls to pursue an undulating path approximating the contour of the rolls, the lowermost points of said path of the impeller being disposed at the valleys between said brushes.

8. In a fruit treating machine, a series of treating rolls arranged transversely of the flow of fruit thereover and in adjacent parallel relation to form fruit supporting valleys therebetween, a pair of spaced endless carrier chains extending above and transversely of said rolls, a fruit impeller for engaging and advancing fruit from valley to valley across the rolls, radius arms projecting angularly from said impeller and secured to said chains for movement thereby to operate said impeller, a stationary guide track, and guide means associated with said impeller for guiding engagement with said track to guide said impeller, said guide track being of wave-like conformation to guide said impeller along an undulating path approximating the contour of the rolls, the lowermost points of said path of the impeller being disposed at the valleys between said brushes.

HALE PAXTON.